2,898,323

CHLOROETHYLENE POLYMERS AND SALICYL-OXY HYDROXY-BENZOPHENONES

Gerald A. Clark, Midland, Mich., assignor to The Dow Chemical Company, Midland, Mich., a corporation of Delaware No Drawing. Application April 23, 1956
Serial No. 579,752

3 Claims. (Cl. 260—45.85)

This invention relates to new organic compounds and to polymeric compositions containing the same. More particularly, it relates to new organic compounds finding utility as light stabilizers for haloethylene polymers.

Haloethylene polymers are known to be highly sensitive to the effects of elevated temperatures and of light and under prolonged exposure to heat and light may become so degraded as to be commercially useless. It has been common practice to blend certain compounds with the polymer to stabilize it against the degradative effects of heat and light. Several of such compounds, however, are colored materials which impart an objectionable initial color to the stabilized composition and thus prevent the production of a commercially salable white composition.

Still other disadvantages of many of the previous compounds are a high odor level and volatility. Obviously, any odor in the stabilizer will be transferred to the stabilized composition. When volatile stabilizers are employed the stabilizers volatilize out of the composition, leaving the composition in time unprotected against the degradative effects of light, particularly ultra-violet light. In addition, all of the compounds vary in their ability to absorb ultra-violet light and it is impossible to predict the effectiveness of any particular compound with any degree of certainty, and some of the compounds lose some of their effectiveness for absorbing ultra-violet light over a prolonged period of time.

In view of the above problems it would be desirable and it is the principal object of the invention to provide a new group of organic compounds useful for the stated purpose.

It is a further object to provide a polymeric haloethylene composition stabilized against the degradative effects of light by means of such compounds.

It is a still further object to provide a group of such compounds which have little or no color and have a low odor level.

Another object is to provide a group of such compounds which have low volatility.

Other objects will become apparent as the description of the invention proceeds.

The above and related objects are accomplished by means of a group of compounds having the general formula:

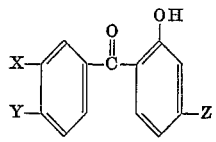

wherein X and Y are selected from the group consisting of H, Cl, Br, and alkyl; and Z is selected from the group consisting of salicylates and hydrocarbon substituted salicylates. As typical examples of compounds that are intended to be included within the scope of the invention may be mentioned the following:

Salicylic acid: (3-hydroxy-4-benzoyl) phenyl ester
Salicylic acid: [3-hydroxy-4-(2-chlorobenzoyl)] phenyl ester
Orthophenylsalicylic acid: (3-hydroxy-4-benzoyl) phenyl ester
Para-t-butyl salicylic acid: (3-hydroxy-4-benzoyl) phenyl ester The method of preparation of the compounds will be illustrated by the following preparation of salicylic acid: (3-hydroxy-4-benzoyl) phenyl ester. Monobenzoyl resorcinol was heated at 40 mm. mercury with a slight excess of phenyl salicylate at a temperature of from 180° to 200° C. The phenol byproduct of the reaction was continuously removed by distillation throughout the reaction. The reaction product was purified by recrystallization from alcohol resulting in pale yellow crystals melting at 128.6–128.7° C. In a similar manner salicylic acid: [3-hydroxy-4-(2-chlorobenzoyl)] phenyl ester was prepared resulting in a white crystalline solid melting at 116–117° C. The structures of the compounds were confirmed by infra-red absorption and by chlorine analysis where applicable. All of the compounds were found to be free of any objectionable odor.

The compounds were evaluated as light stabilizers for haloethylene polymers. Because of their low odor and color levels they produced compositions which were more merchandisable than compositions prepared from previous stabilizers. The effectiveness of the stabilizers will be more apparent from the following illustrative example wherein all parts and percentages are by weight.

A series of samples was prepared from a basic formulation consisting of 90.15 parts of a copolymer prepared from 85 percent vinylidene chloride and 15 percent vinyl chloride, 7 parts of a mixed tetraester of pentaerythritol having fatty acid groups of $C_8$ and $C_{10}$ chain length, as a plasticizer, 0.5 part of sodium tripolyphosphate, 0.5 part of disodium lauryl phosphate, 0.5 part of sorbiton monostearate, 0.3 part of citric acid, and 0.05 part of maleic anhydride as heat stabilizers and extrusion aids. One of the samples was left as a blank. To each of the others was added a light stabilizer. The samples were molded into specimens 0.01 inch thick and exposed to sun lamps until a standard amount of browning had been reached. The specimens were also exposed to direct sunlight in the State of Arizona until a standard amount of browning had been reached. The results are listed in Table I.

Table I

| Stabilizer | Percent Stabilizer | Hours to standard browning | |
|---|---|---|---|
| | | Under Sunlamps | Under direct Sunlight |
| None | | 38 | 325 |
| Phenyl salicylate (for contrast) | 4.0 | 200 | 700 |
| Salicylic acid: (3-hydroxy-4-benzoyl) phenyl ester | 1.0 | 336 | 1,000 |
| Salicylic acid: [3-hydroxy-4-(2-chlorobenzoyl)] phenyl ester | 2.0 | 336 | 1,000 |

These and other tests have shown the new compounds to be useful light stabilizers for the various haloethylene polymers, including vinylidene chloride polymers and copolymers and vinyl chloride polymers and copolymers. The most useful range of concentration of the new compounds in such compositions is from 1 to 4 percent by weight.

I claim:
1. A thermoplastic composition comprising a chloroethylene polymer and from 1 to 4 percent of a compound having the general formula:

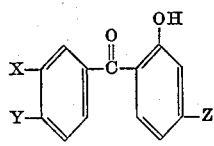

wherein X and Y are selected from the group consisting of hydrogen, chlorine, and bromine, and Z is selected from the group consisting of salicyloxy and aliphatic alkyl substituted salicyloxy.

2. The composition claimed in claim 1 wherein said compound has the formula:

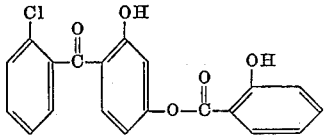

3. The composition claimed in claim 1 wherein said compound has the formula:

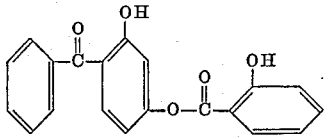

References Cited in the file of this patent
UNITED STATES PATENTS

| | | |
|---|---|---|
| 2,157,068 | Carruthers et al. | May 2, 1939 |
| 2,392,361 | Britton et al. | Jan. 8, 1946 |
| 2,445,739 | Rowland et al. | July 20, 1948 |